United States Patent [19]
Whitehead

[11] Patent Number: 4,592,976
[45] Date of Patent: Jun. 3, 1986

[54] IDENTIFICATION CARD

[75] Inventor: Edwin N. Whitehead, Alexandria, Va.

[73] Assignee: N. Peter Whitehead, Charlottesville, Va.

[21] Appl. No.: 679,280

[22] Filed: Dec. 7, 1984

[51] Int. Cl.[4] .......................... B42D 15/00; G03C 1/76; C09F 3/02

[52] U.S. Cl. .......................................... 430/10; 40/626; 283/77; 283/112; 428/200; 428/203; 428/916; 430/11; 430/13; 430/14; 430/18; 430/538

[58] Field of Search ......................... 430/10, 11, 13, 14, 430/18, 538; 40/626; 283/77, 112; 428/916, 200, 203

[56] References Cited

U.S. PATENT DOCUMENTS

| | | | |
|---|---|---|---|
| 196,510 | 10/1877 | Winter . | |
| 2,350,124 | 5/1944 | Nadeau et al. . | |
| 2,418,303 | 4/1947 | Hutchison . | |
| 2,670,288 | 2/1954 | Smith . | |
| 2,698,239 | 12/1954 | Alles et al. . | |
| 2,710,814 | 4/1951 | Mears . | |
| 2,848,327 | 8/1958 | Eichorn . | |
| 3,022,169 | 2/1962 | Heckelmann . | |
| 3,035,915 | 5/1962 | Cohen et al. . | |
| 3,159,488 | 1/1964 | O'Connor et al. . | |
| 3,271,178 | 9/1966 | Nadeau et al. . | |
| 3,316,118 | 4/1967 | Landskroener . | |
| 3,520,758 | 8/1967 | Wiest . | |
| 3,635,853 | 1/1972 | Wiest . | |
| 3,674,622 | 7/1972 | Plasse . | |
| 3,720,539 | 3/1973 | Seibel et al. . | |
| 3,730,830 | 5/1973 | Driscoll . | |
| 4,066,814 | 3/1973 | Chiklis . | |
| 4,133,926 | 1/1979 | Vorrier et al. . | |
| 4,187,113 | 2/1980 | Mathews et al. . | |
| 4,238,280 | 12/1980 | Wallis et al. . | |
| 4,247,318 | 1/1981 | Lee et al. ............................ | 428/916 |
| 4,309,713 | 1/1982 | Shinozaki et al. . | |
| 4,310,591 | 1/1982 | Lee et al. ............................ | 428/916 |
| 4,324,421 | 4/1982 | Moraw et al. ....................... | 428/916 |
| 4,341,833 | 7/1982 | Schafer et al. . | |
| 4,378,392 | 3/1983 | Segel . | |

*Primary Examiner*—James C. Cannon

[57] ABSTRACT

Provided is an identification card having a photographic image support, the lower layer of which is impregnated with a hot-melt type thermoplastic adhesive, and a laminable indicia bearing layer and a durable resilient backing to which the support and bearing layer are laminated.

17 Claims, 4 Drawing Figures

IDENTIFICATION CARD

This invention relates to substantially tamperproof identification cards. More particularly, this invention relates to a laminable sheet of a material which accepts and retains a photographic emulsion such as tightly woven cotton fabric or spun-bonded polyester on which a photographic image is reproduced and the use of these sheets in tamper resistant identification cards.

BACKGROUND OF THE INVENTION

The development of tamper resistant identification card technology does not correspond to the level of sophistication of criminal activity directed to forgery, alteration and counterfeiting thereof.

Combinations of available techniques and materials have been suggested to thwart such activities. Defined herein is a novel combination of techniques and materials which is intended to advance the technology of identification cards and production thereof and simultaneously contribute to the efforts to overcome criminal activity associated therewith.

Identification cards often include identifying indicia and a photographic likeness of the carrier or owner. This invention is directed to such cards. Many materials are now used as supports for photographic image reproduction in the context of identification cards. The most commonly employed and best known supports for photographic image reproduction are cellulose fiber based paper products. Photographic papers are generally composed of a web of highly processed cellulose fibers which provide an opaque, contrasting background. In order to produce a light-sensitive product, the paper is treated with photo-sensitive materials such as silver halides. The paper is coated or bathed with a solution which migrates into the interstices or voids within the fiberous web and become physically trapped therein upon drying. Once exposed to light, generally via an image projection source, and processed chemically, a photographic positive is formed on the paper.

Textile supports such as cotton fabrics are also well known photographic emulsion supports. For example, U.S. Pat. No. 196,150 teaches a method for production of photographic images on a woven fabric. The advantages of strength and durability conveyed by a woven support make for its desirability for a photographic support and especially in the context of an identification card.

Alternative supports and technologies are now challenging these old products. The advantages of synthetic polymeric photo-receptive emulsion supports are now recognized. These advantages have led to broad commercial acceptance primarily in the area of instant photography. Generally these supports include one surface being coated with photo-sensitive compounds suspended in a gelatinous material, subbing layers to physically bind the material in one position and a laminated protective cover of a clear, transparent polymeric material. The cover is generally sealed to the support along their respective peripheries. Such arrangements are more clearly exemplified in U.S. Pat. Nos. 4,066,814; 3,271,178; 2,698,239.

Each type of support, cellulose, woven textile and synthetic polymer, possess various practical advantages and limitations relative to each other. In the case of cellulose supports, the texture and quality of the photographic image may be greatly varied depending on the requirements of the user. Moreover, a user may obtain photographic "paper" in most any size permitting great latitude in selecting the size of the end product. Cellulose supports, on the other hand, are fragile and require care to preserve their integrity.

Turning now to fabric supports, often it is difficult to control the quality of the finished product due to imperfections and intersticies between the threads forming the warp and woof. Textile fabrics, however, are less fragile than "paper" type products and thus provide a more durable image support.

Synthetic supports may be manufactured to most any specification to impart specifically desired properties. For instance, the supports can be made heat-resistant and tear resistant. Moreover, the requirement of covering these substrates renders the resulting photographs waterproof and stainproof. However, it is this requirement which limits the availability of a wide variety of sizes and shapes. Moreover, the commercially available variations are considerably limited regarding the quality and the texture of resulting images in contrast to paper supports.

Many devices and methods are employed to improve fraud detering and tamper-resistant characteristics of identification cards. In the military, government and industry, many installations demand security which has led to the development of many means and techniques to insure improper or surreptitious access to such installations and the projects under development therein. Photographic or image bearing identification cards have long been the target of forgery or alteration by persons attempting to gain access to facilities guarding secret material. Great efforts have been devoted to deter these activities. One such effort is disclosed in my U.S. Pat. No. 4,097,279 which provides a laminated identification card incorporating a magnetic metal backing.

Bonding a photographic image of the bearer onto a strong backing makes tampering with the photographic image more difficult. Such bonding technique exemplifies technologies dedicated to perfecting a photographic image bearing identification card. Even in light of all these efforts, there exists a conspicuous absence of material addressing modification of the photographic image carrier or substrate to render an identification card tamper or fraud resistant.

SUMMARY OF THE INVENTION

It is, therefore, an object of this invention to provide a photographic emulsion receiving support which provides the benefits of known emulsion receiving supports.

It is another object of this invention to produce a support for photographic images yielding images of adequate quality.

Yet another object of this invention is to provide a photographic image support capable of lamination.

Still another object of this invention is to provide an identification card which prevents tampering or alteration.

Another object of this invention is to provide an identification card including a photograhic image laminated to a support.

These and other objects are satisfied by an identification card including a laminable spun-bonded polyester or tightly woven textile fabric photographic image support. One surface of the support is impregnated with polyvinyl chloride and is laminable to a durable resilient backing.

A laminable woven fabric such as balloon cloth (tightly woven cotton fabric) provides an excellent photographic emulsion support. Also, it has been discovered that spun-bonded polyester provides excellent qualities as a support. Both types of material are particularly useful in the tamper-resistant identification card art.

Spun-bonded polyester support possesses several characteristics similar to a cellulose support. Upon forming polyester fibers into a web, interstices and voids are formed much like those found in cellulose fiber webs. Accordingly, upon coating a photosensitive emulsion onto one surface of a spun-bonded polyester support, the emulsion migrates into the voids. Once dry, the emulsion is trapped within the interstices. As in the case of cellulose supports, a variety of image qualities, textures and grains may be obtained by treating polyester supports by various known methods. Polyester is less fragile than cellulose and, thus, the ruggedness of spun-bonded polyester when employed as a support results in greater durability. Furthermore, polyester is capable of specialized processing which is generally not employed with cellulose supports.

Spun-bonded polyester, like conventional woven textiles, is not a satisfactory adhesive, hot melted or otherwise, but possesses the capacity to combine with another material having hot-melt adhesive characteristics. The lower portion of a sheet of spun-bonded polyester or tightly woven textile fabrics may be partially impregnated with polyvinyl chloride to provide mastic characteristics lacking in the support itself. Thus, a photographic image created on a spun-bonded polyester or fabric receiving substrate which is partially impregnated with polyvinyl chloride on the opposite surface, may be laminated to white coated steel supporting receiving materials adapted to receive same. In the particular context of security identification cards, a polyvinyl chloride coated metal core may be used as a support for the photographic image.

DETAILED DESCRIPTION OF THE DRAWINGS

Figure 1:
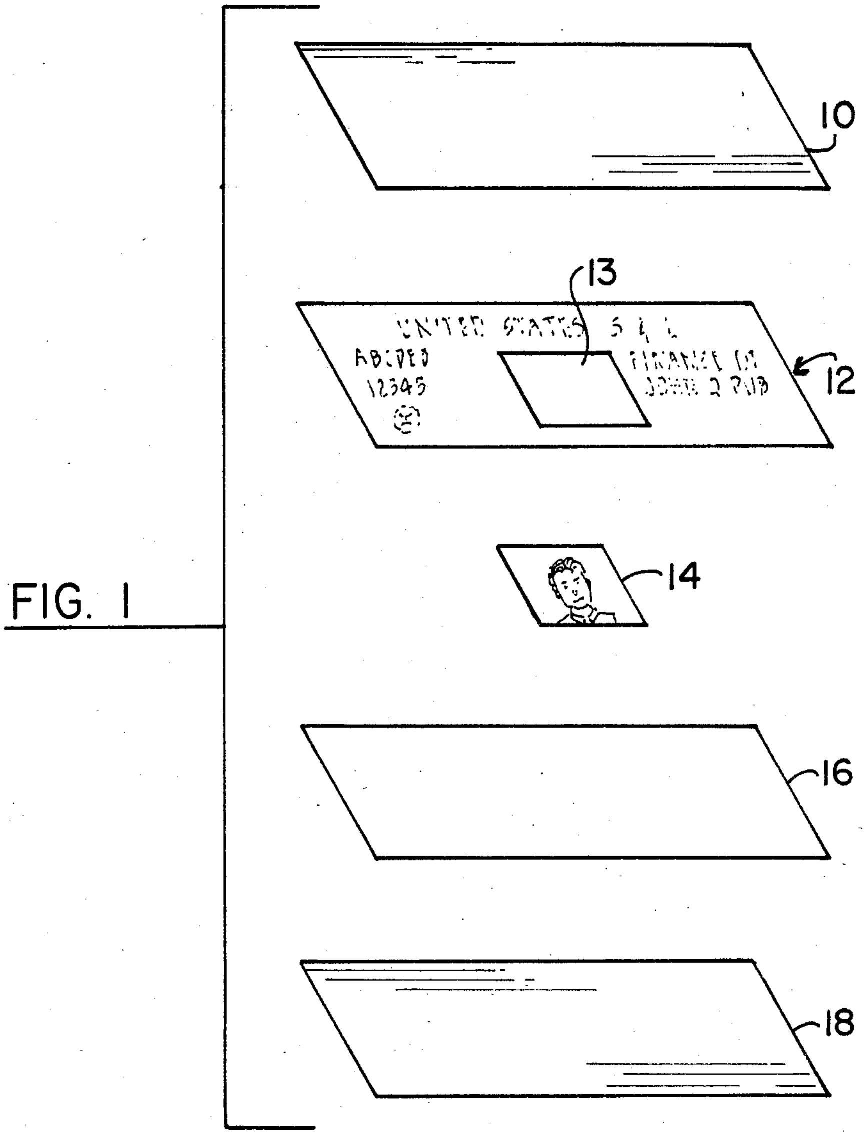
FIG. 1 is an exploded view of the components of an identification card in accordance with this invention.

As illustrated in FIG. 1, front cover 10 and back cover 18 are selected from any appropriate clear, transparent polymeric material. Generally the material should possess heat-sealing characteristics so the outer, bottom surface of cover 10 may be sealed to the outer, upper surface of cover 18 and therefor encapsulate the informational portion of the card. Thermoplastic materials which prove adequate for such use include polyvinyl acetate and polyvinyl chloride. In order not to render the resulting card too cumbersome, the thickness of covers 10 and 18 should be in a range of about 5 mils.

Figure 2:
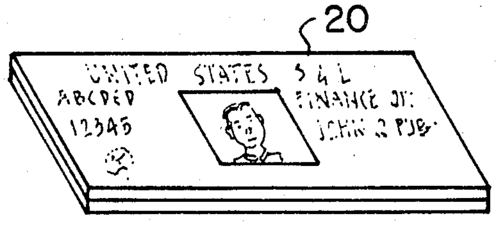
FIG. 2 is a perspective view of an identification card in accordance with this invention.

Indicia bearing layer 12 comprises part of the informational core of the identification card and is comprised from a sheet of material such as polyvinyl chloride, polyvinyl acetate, polyester, etc. The depth of the sheet should fall into a range which minimizes the thickness of the card 20 as illustrated in FIG. 2 (approximately 5 mils). Layer 12 may incorporate any known features employed to reduce the potential for alteration or forgery. However, layer 12 may be composed of no more than simple thermoplastic PVC sheet having desired information printed thereon. Layer 12 includes opening 13 designed to have image bearing support 14 fit therein so that the back of support 14 is in direct contact with backing 16. Moreover, the thickness of layer 12 and support 14 are substantially equivalent so when the substrate and layer are combined, a relatively smooth, uniform surface results. Opening 13 provides the reverse side of 14 to be in direct contact with 16.

Figure 3:
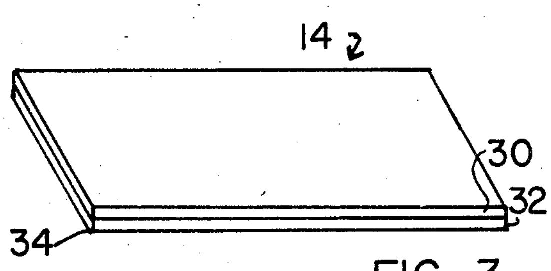
FIG. 3 is a perspective view of a photographic image support in accordance with this invention.

FIG. 3 illustrates the preferred embodiment of a laminated, photographic image bearing support sheet 14. Layer 30, a 5 mil sheet of spun-bonded polyester, comprises non-woven, heat and pressure compacted, continuous filament, polyester fibers sold as "Holleytex" by Filtration Sciences Corporation, a division of Eaton-Dikeman located in Mount Holley Springs, Pa. These sheets are further processed from sheets of spun-bonded polyester available from DuPont Company, of Delaware sold under the name of "Reemay". Preferably, a 3-8 mil sheet and more preferably a 5 mil sheet of "Holleytex" may be used to provide a photographic image-bearing surface.

Spun-bonded polyester sheets of this type have now been found to possess similar emulsion migration characteristics of cellulose-based, photographic paper. When subjected to light sensitive, photographic emulsions, the spun-bonded polyester permits migration and therefore physical entrapment of an emulsion within the pores and cavities formed within the compacted polyester fibers. Thus a relatively uniform coating may be achieved by known techniques such as spraying, brushing, immersion, etc. Once dry, the spun-bonded polyester, sensitized sheets possess similar storage and photographic-image reproduction capacity as cellulose based products and are also processable in the same manner thereby obviating the need for any specialized equipment in a "dark room" or photographic development laboratory.

Figure 4:
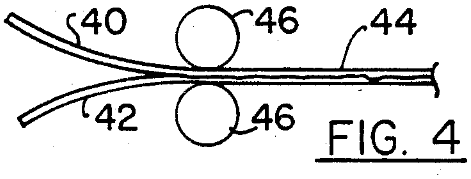
FIG. 4 is a depiction of a lamination procedure in accordance with the invention.

As illustrated in FIG. 4, in the preferred embodiment of this invention, 5 mil sheet of spun-bonded polyester 40 is laminated to 2 mil polyvinyl chloride sheet 42 such as that available from Union Carbide Corporation. Using hot rollers 46 at about 350° F. the polyvinyl chloride softens and flows into the 176° C. (350° F.) polyester fibers to penetrate approximately half the depth of the polyester sheet (1–3 mils). Resulting laminated sheet 44 yields a product providing a better contrasting background and which may be cut to any desired size or configuration as illustrated in FIG. 3 by sheet 14. Sheet 14, approximately 6 mils in thickness, includes polyvinyl chloride layer 32 and spun-bonded polyester layer 30 which is capable of receiving the photographic image emulsion. Lying between layer 30 and 32 is impregnated zone 34 including both spun-bonded polyester and polyvinyl chloride which has migrated into the pores and is therefore physically bound to the polyester sheet.

As illustrated in FIGS. 1 and 2, sheet 14 is sized to correspond with space 13 in indicia bearing sheet 12. A photographic image may be developed on sheet 14. Once exposed to an image, devleoped by conventional aqueous solutions and dried, sheet 14 is placed within space 13 in sheet 12 and onto backing 16. Although any durable resilient material capable of lamanation can be employed, it is preferred that backing 16 is made from a thin sheet (approx. 20 mil) tempered steel which has been etched by reverse electro plating, sand blasting or reverse grinding technique. To obtain a raw steel surface which is free of any oxidization and backing 16 is comprised of thin magnetizable steel coated with a layer of the raw opague white polyvinyl chloride and then baked to promote bonding of sheets 12, 14 and 16 thereto. Metal backing 16 may include additional fraud preventing features such as those disclosed in my earlier U.S. Pat. No. 4,097,279, which for this purpose, is incorporated herein by reference. The principal reason for using a metal backing is to minimize tampering of the photographic image carrying, spun-bonded polyester.

Turning now to the processing of backing 16, in the preferred embodiment it should be etched in order to provide a uniform coating of polyvinyl chloride thereon. Conventional means such as sandblasting or other ablative surface treatments are suitable for this purpose. More sophisticated techniques, as for example, reverse electroplating, also serve to roughen and clean the surfaces of backing 16. When etched, it is easy to obtain uniform coating of polyvinyl chloride on the surfaces.

The most efficient coating method has been found to involve immersing backing 16 into a polyvinyl chloride solution and baking the coating. The solution is composed of 65 parts THF (tetrahydrofuran), 25 parts methyl isobutyl ketone, 10 parts MEK (methyl ethyl ketone), a sufficient amount of polyvinyl chloride to produce a syrupy mixture having the consistency of molasses and $TiO_2$ (titanium dioxide) pigment for white coloration. One polyvinyl chloride material eminently suitable for coating backing 16 is Union Carbide "VMCH" which contains about 86% polymer, 13% vinyl acetate and 1% maleic acid. Upon dipping and removal of etched backing 16 from the solution it is baked in an oven for about three minutes at a temperature of 204° C. (400° F.). The baking produces a dry, hardened uniform polyvinyl chloride surface as backing 16.

Lamination of polyvinyl chloride impregnated substrate 14 to polyvinyl chloride coated metal backing 16 is accomplished by hydraulic hot platen press at 176° F. (350° F.) and 500–1000 psi up to approximately two minutes. Once laminated to the metal backing, photographic bearing substrate 14 cannot be removed or altered without injury to both the substrate and the metal backing. In addition, indicia bearing layer 12, also comprising a polyvinyl chloride sheet, is rendered substantially tamper resistant in the same manner.

Photographic image bearing identification card 20, in accordance with the preferred embodiment of the invention, includes top, sealable cover 10, a core comprising polyvinyl chloride, indicia bearing layer 12 having space 13 provided therein, laminated spun-bonded polyester photographic image bearing support 14 compatible with and placed within space 13, polyvinyl chloride coated metal backing 16 onto which substrate 14 and layer 12 are laminated with heat and pressure and lastly, of bottom sealable cover 18 which seals to top cover 10 and encapsulate the core. It is contemplated that other known tamper resistant means and methods may also be incorporated into disclosed identification cards such as security threads 10A, magnetic tapes, special dyes, indicia patterns, etc.

An alternative embodiment to these of the spun-bonded polyester as the support sheet for the photographic image in the context of this invention, is tightly woven, durable, textile materials. It has been determined that substituting textiles for the polyester support does not lead to any modification of the above specified lamination techniques or equipments. A tightly woven, cotton textile material such as CRITERION B/C 11, produced by Dan River, Inc. of Danville, Va. proves eminently satisfactory for producing photographic images thereon. Like spun-bonded polyester, upon coating or immersion of the woven textile into a light-sensitive emulsion, the emulsion migrates into interstices in the threads comprising the woven fabric and is trapped therein. Further, like spun-bonded polyester, the tightly woven textile is capable of partial impregnation with PVC for lamination. Thus, a tightly woven fabric provides a durable, strong, image suport which assists to prevent tampering in the context of an identification card according to this invention.

In view of this disclosure, a skilled artisan can devise modifications and variations of the identification card and/or the photographic emulsion receiving substrate which fall within the intent and scope of the invention as defined in the following claims.

I claim:

1. An identification card, comprising (a) a laminable, photographic image support selected from the group consisting of a spun-bonded polyester and a tightly-woven fabric including an upper layer impregnated with a light-sensitive photographic emulsion for reproduction of a photographic image thereon, and a lower layer impregnated with a hot melt thermoplastic adhesive having bonding characteristics of polyvinyl chloride, (b) a laminable, identification indicia bearing layer, (c) a durable resilient backing adapted to have said support and said indicia bearing layer laminated thereto where upon application of sufficient energy irreversible bonding of said support and indicia bearing layer to said backing is effected.

2. A card according to claim 1 wherein said backing is metal.

3. A card according to claim 2 where the metal backing is etched.

4. A card according to claim 3 further comprising a uniform layer of polyvinyl chloride coated on the metal etched surface.

5. A card according to claim 4 where said backing has been coated with solvated polyvinyl chloride colored with white pigment.

6. A card according to claim 2 wherein the adhesive is provided by a sheet of polyvinyl chloride laminated to the image support in a manner where the polyvinyl chloride only partially penetrates the support thereby rendering one surface laminable.

7. A card according to claim 6 further comprising a polyvinyl chloride surface on said metal backing.

8. A card according to claim 7 wherein said indicia bearing layer is composed of polyvinyl chloride.

9. A card according to claim 6 wherein said image support is composed of a tightly woven textile.

10. A card according to claim 7 where said fabric is composed of neutral-colored cotton fiber thread.

11. A card according to claim 6 wherein said image support is composed of spun-bonded polyester.

12. A card according to claim 6 further comprising transparent thermoplastic top cover placed over said indicia and said photographic image bearing substrate and a thermoplastic back cover placed under said backing in a manner where said front and back covers encapsulate the laminated support, indicia bearing surface and backing.

13. A card in accordance with claim 12 wherein said thermoplastic back cover is sealable to said top cover for encapsulating the laminated core.

14. A card according to claim 13 further comprising a security thread laminated between said photographic image bearing substrate and said top cover.

15. An identification card, comprising (a) a photographic image support having intersticies and voids and an upper and lower surface, said support selected from the group consisting of spun bonded polyester and a tightly woven fabric, said support enabling migration of a photographic emulsion into said intersticies and voids proximate to said upper surface, said support further incorporating a hot-melt thermoplastic adhesive impregnating said lower surface, (b) a laminable, identification indicia bearing layer, (c) a durable resilient backing adapted to have said support and said indicia bearing layer laminated thereto where upon application of sufficient energy irreversible bonding of said support and indicia bearing layer to said backing is effected.

16. An indentification card, comprising (a) a laminable photographic support, said support being selected from the group consisting of spun bonded polyester and tightly woven fabric, said support permitting migration of a photographic emulsion therein, (b) a durable resilient backing, (c) a layer of hot melt adhesive disposed between said support and said backing, said adhesive being capable of impregnating at least a portion of said support and uniting said backing and support at lamination conditions, (d) a laminable, identification indicia bearing layer adapted to laminate to said backing at lamination conditions, (e) whereupon positioning said support and layer on said backing and establishing lamination conditions renders said adhesive flowable to irreversibly bond said support to said backing and said layer laminates to said backing.

17. A card according to claim 16 further comprising a transparent, plastic covering to encapsulate the card.

* * * * *